United States Patent
Honda (10) Patent No.: US 6,509,933 B1
(45) Date of Patent: Jan. 21, 2003

(54) VIDEO SIGNAL CONVERTING APPARATUS

(75) Inventor: Hirofumi Honda, Yamanashi (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/576,771

(22) Filed: May 23, 2000

(30) Foreign Application Priority Data

May 25, 1999 (JP) .......................................... 11-145233

(51) Int. Cl.$^7$ .............................. H04N 5/46; H04N 7/01
(52) U.S. Cl. ........................ 348/558; 348/459; 348/911
(58) Field of Search ................................. 348/448, 449, 348/458, 445, 441, 558, 443, 459, 911, 526, 97; H04N 5/46, 7/01, 11/20, 5/08

(56) References Cited

U.S. PATENT DOCUMENTS

| | | | | |
|---|---|---|---|---|
| 5,347,312 A | * | 9/1994 | Saunders et al. ........... | 348/443 |
| 5,835,672 A | * | 11/1998 | Yagasaki et al. ............ | 386/111 |
| 5,982,444 A | * | 11/1999 | Kato et al. .................. | 348/446 |
| 6,154,257 A | * | 11/2000 | Honda et al. ............... | 348/558 |
| 6,340,990 B1 | * | 1/2002 | Wilson ....................... | 348/448 |

* cited by examiner

Primary Examiner—John Miller
Assistant Examiner—Trang U. Tran
(74) Attorney, Agent, or Firm—Sughrue Mion, PLLC (57) ABSTRACT

Whether or not an input video signal is an video signal telecine-converted is decided on the basis of correlation values between an interpolated field and fields located one-field-period before and after the interpolated field. Where the interpolated field is an editing point field of a film frame of one field, adaptive interpolating processing is executed instead of film interpolating processing.

10 Claims, 5 Drawing Sheets

VIDEO SIGNAL CONVERTING APPARATUS

BACKGROUND OF THE INVENTION

1. Field of the Invention

The present invention relates to a video signal converting apparatus for converting a video signal by 40 laced scanning into a video signal by sequential scanning, and more particularly to a video signal converting apparatus for subjecting the video signal by interlaced scanning to scanning line converting processing suited to the case where it is a telecine-converted video signal created from the screening film by the 2-3 pulldown system.

2. Description of the Related Art

A video signal conversion technique is well known, which converts a video signal from a screening film into a video signal in a standard television system such as an NTSC system, and reproduces the converted video signal as well as a video signal in an ordinary television system.

In the screening film, a spatial image is sampled as 24 frames per second, whereas in the NTSC system, the spatial image is sampled as 30 frames per second (60 fields per second). Since both adopt different sampling systems, the video signal obtained from the screening film is once telecine-converted by the 2-3 pull-down system to provide a video signal suited to the standard television system such as the NTSC system.

In order to make the telecine conversion by the 2-3 pull-down system, first, the screening film is read/scanned to create the video signal by the sequential scanning which is synchronous with the frame frequency of 24 Hz. In this case, the first frame of the screening film is caused t-o correspond to the first and second fields, the second frame is caused to correspond to the third to fifth fields, the third frame is caused to correspond to the sixth to seventh fields, the fourth frame is caused to correspond to the eighth to tenth fields. Likewise, the remaining frames are also caused to correspond to the fields. Additionally, the fifth field of the standard television system is caused to have the same image contents as those of the third field and the eighth field is caused to have the same image contents as those of the fifth field. Likewise, the remaining fields are also repeated.

In this way, in the 2-3 pulldown system, the telecine conversion is made in such a manner that the two frames of the screening film are caused to correspond to the five fields in the standard television system and according to the frame advance of the screening film, the two fields and the three fields in the standard television system are repeated alternately.

As described above, since the third filed and the fifth field, and the eighth field and tenth field have the same image contents, the inter-frame difference between the fifth field and tenth field is zero. Such a relationship occur severy five fields. Specifically, the absolute value of the inter-frame difference for a single field and the integrated value is compared with a prescribed threshold value. If the integrated value is larger than the threshold value, it is decided to be "moving (dynamic) filed", and in the other cases, it is decided to be "still (static) field". Thus, in the video signal converted by the 2-3 pulldown system, the still field occurs every five fields in an arithmetic progression.

Using such a characteristic, it is determined whether or not the video signal telecine-converted by the 2-3 pulldown system is included in the video signal in the standard television system, and the former is discriminated from the latter. On the basis of the result of determination, the video signal in the sequential scanning is created from the video signal by the interlaced scanning.

However, in the above conventional discriminating method, the video signal in the standard television system cannot be quickly discriminated from the telecine-converted video signal so that it takes a long time to create the video signal by the sequential scanning from the video signal in the interlaced scanning.

Specifically, in the above conventional discriminating method, the integrated value which is acquired by integrating the absolute value of the inter-frame difference over a single field is compared with a prescribed threshold value, and such processing is repeated over plural fields to detect a periodic pattern of the telecine-converted image. On the basis of this detection result, the video signal in the standard television system is discriminated from the telecine-converted video signal.

Therefore, it lakes a long time to make the discriminating processing. For example, it was difficult to prevent quickly degradation of the reproduced image by, for example, quickly detecting the switching point between the telecine-converted video signal and the ordinary video signal, or quickly detecting a change in the editing point of the video signal once edited. There was also a problem that the discriminating method must be changed according to the detected periodic pattern.

SUMMARY OF THE INVENTION

The present invention has been accomplished in order to overcome the problem of the above conventional technique. An object of the invention is to provide a video signal converting apparatus which can quickly and suitably make the switching of scanning line interpolating processing at a discontinuous position of the periodic pattern of the video signal, such as a switching point between a telecine-converted video signal and an ordinary video signal and a change in the editing point of the video signal, etc.

In order to attain the above object, the present invention provides a video signal converting apparatus for creating an interpolated scanning signal from an input video signal by interlaced scanning and interposing an actual scanning signal of the input video signal and the interpolated scanning signal between each other to create a video signal by sequential scanning, comprising:

a first detecting means for detecting a first correlation value between an interpolated field in the input video signal and a first field located one-field-period-before it;

a second detecting means for detecting a second correlation value between an interpolated field in the input video signal and a second field located one-field-period-after it;

a first deciding means for deciding whether the interpolated field is a telecine-converted video signal and deciding an interpolating method where it is the telecine-converted video signal;

a second deciding means for deciding whether or not the interpolated field is an editing point field of a film frame of one field; and an interpolated signal creating means for setting the interpolating processing for the interpolated field at either of adaptive interpolating processing and film interpolating processing in response to the decision results of the first and the second deciding means to create the interpolated scanning signal, characterized in that if it is decided that the interpolated field is the telecine-converted video signal on the basis of the decision result of the first deciding means, the interpolated signal creating means sets the interpolating processing for the interpolated field at the film interpolating processing to create the interpolated scanning signal; and if it is decided that the interpolated field is the editing field on the basis of the decision result of the second deciding means, the interpolated signal creating means sets the interpolating processing for the interpolated field at the adaptive interpolating processing to create the interpolated signal.

In such a configuration, the telecine-converted video signal of a succession of film frames each having tow fields or more can be detected quickly and surely, and the editing field of the film frame of one field is subjected to suitable interpolating processing. For this reason, the display quality of the video signal by the sequential scanning can be improved which is created from the video signal by the interlaced scanning telecine-converted by the interpolating processing.

The present invention also provides a video signal converting apparatus for creating an interpolated scanning signal from an input video signal by interlaced scanning and interposing an actual scanning signal of the input video signal and the interpolated scanning signal between each other to create a video signal by sequential scanning, comprising:

a first detecting means for detecting a first correlation value between an interpolated field in the input video signal and a first field located one-field-period-before it;

a second detecting means for detecting a second correlation value between an interpolated field in the input video signal and a second field located one-field-period-after it;

a first deciding means for deciding whether the interpolated field is a telecine-converted video signal and deciding an interpolating direction where it is the telecine-converted video signal;

a third deciding means for deciding whether or not there is a movement of one dot or so per one field in the vertical scanning direction on the interpolated field; and an interpolated signal creating means for setting the interpolating processing for the interpolated field at either of adaptive interpolating processing and film interpolating processing in response to the decision results of the first deciding means to create the interpolated scanning signal, characterized in that if it is decided that the interpolated field is the telecine-converted video signal on the basis of the decision result of the first deciding means, the interpolated signal creating means sets the interpolating processing for the interpolated field at the film interpolating processing; and if it is decided that there is a movement in the vertical direction on the basis of the decision result of the third deciding means, the interpolated signal creating means sets the interpolating direction in the film interpolating processing at a direction reverse to that decided by the first deciding means.

In such a configuration, the telecine-converted video signal of a succession of film frames each having tow fields or more can be detected quickly and surely, and the case where there is a movement of one dot or so per one field in the vertical scanning direction is subjected to suitable interpolating processing. For this reason, the display quality of the video signal by the sequential scanning can be improved which is created from the video signal by the interlaced scanning telecine-converted by the interpolating processing.

DETAILED DESCRIPTION OF THE PRESENT INVENTION

Figure 1:
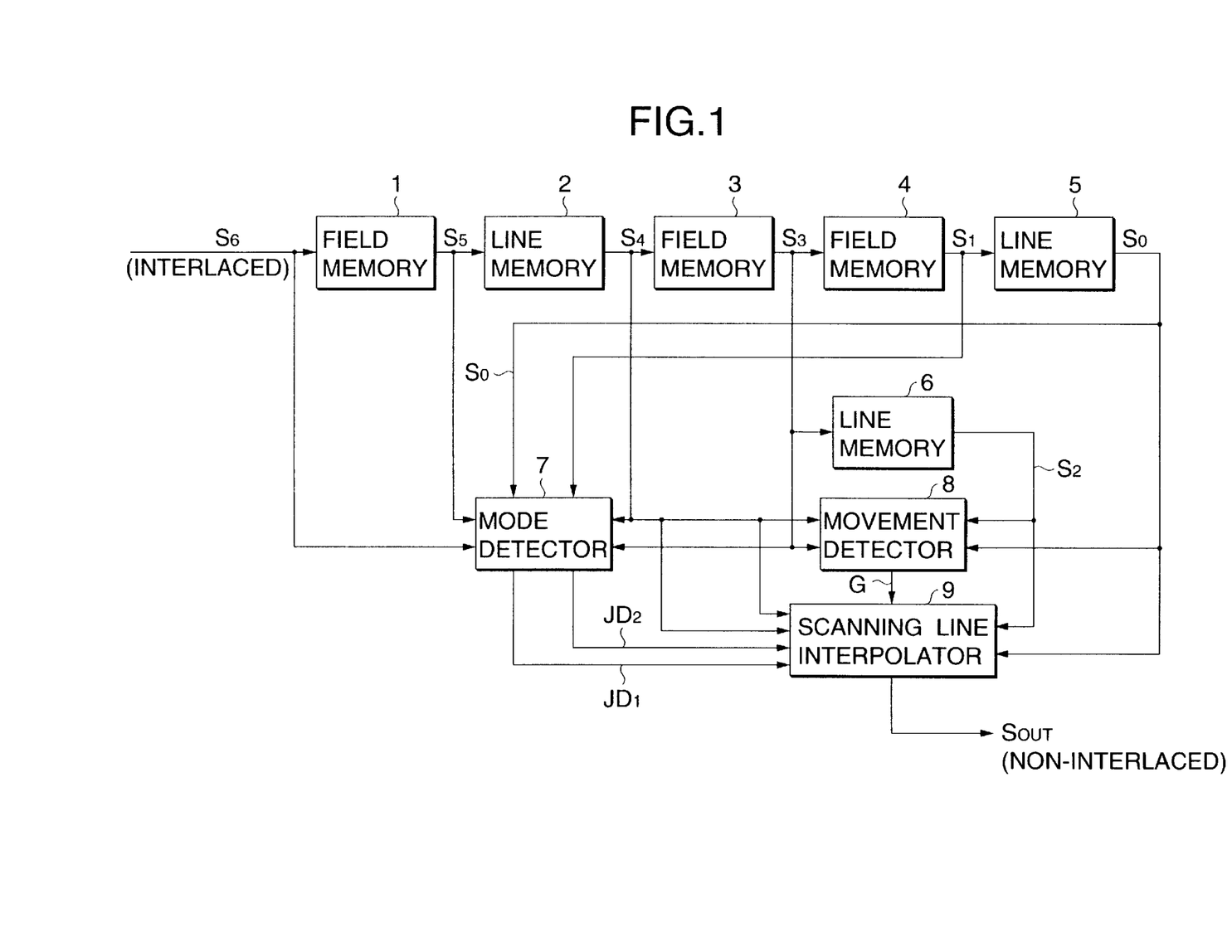
FIG. 1 is a block diagram showing the configuration of a video signal converting apparatus according to an embodiment of the invention.

Referring to the drawings, an explanation will be given of an embodiment of the invention. FIG. 1 is a block diagram of a circuit configuration of the video signal converting apparatus according to the embodiment of the invention.

As seen from FIG. 1, in the video signal converting apparatus, an interpolated scanning signal is created from an actual scanning signal of an input video signal by interlaced scanning, and the interpolated scanning signal and the actual scanning signal of the input video signal are interposed between each other, thereby creating the video signal by the sequential (non-interlaced) scanning. The video signal converting apparatus as shown in FIG. 1 can also be applied to e.g. a plasma display panel (PDP).

Where a color video signal is to be processed, two or more video signal converting apparatuses as shown in FIG. 1 are arranged so as to correspond to e.g. luminance signal and a color signal.

As seen from FIG. 1, the video signal converting apparatus includes three field memories 1, 3 and 4, three line memories 2, 5 and 6, a mode detector 7, a movement detector 8 for detecting movement of an image, and a scanning line interpolator 9 for scanning-line interpolating the detected outputs from the mode detector 7 and movement detector 8.

The field memory 1 delays an input video signal S6 by the interlaced scanning by one field to produce an video signal S5. The line memory 2 delays the video signal S5 from the field memory 1 by one horizontal scanning period (1 H period) to produce a video signal S4. The field memory 4 delays the video signal S4 from the line memory 2 by one field to produce a video signal S3. The line memory 6 delays the video signal S3 from the field memory 3 by 1 H period to produce a video signal S2. The field memory 4 delays the video signal S3 from the field memory 3 by one field period to produce a video signal S1. The line memory 5 delays the video signal S1 from the field memory 4 by one field period to produce a video signal S0.

Therefore, the video signal S5 is a signal one-field-period ahead of the input video signal S6; the video signal S4 is a signal 1 H period ahead of the video signal S5; the video signal S3 is a signal one-field-period ahead of the video signal S4; the video signal S2 is a signal 1 H period ahead of the video signal S3; the video signal S1 is a signal one-field-period ahead of the video signal S3; and the video signal S0 is a signal 1 H period ahead of the video signal S1.

The video signals S6, S5, S3, S1 and S0 are supplied to the mode detector 7, and the video signals S4, S3, S2 and S0 are supplied to the movement detector 8 and scanning line interpolator 9.

The mode detector 7 detects whether the input video signal is a video signal (hereinafter referred to as "film mode signal") having the format acquired by telecine-converting the video signal of 24 frames per second from a screening film by the 2-3 pulldown system, or another video signal (hereinafter referred to as "TV mode signal") having the format based on the ordinary standard television system picked up by a television camera or the like. The mode detector 7 also detects the interpolating direction where the input video signal is the film mode signal.

Figure 2:
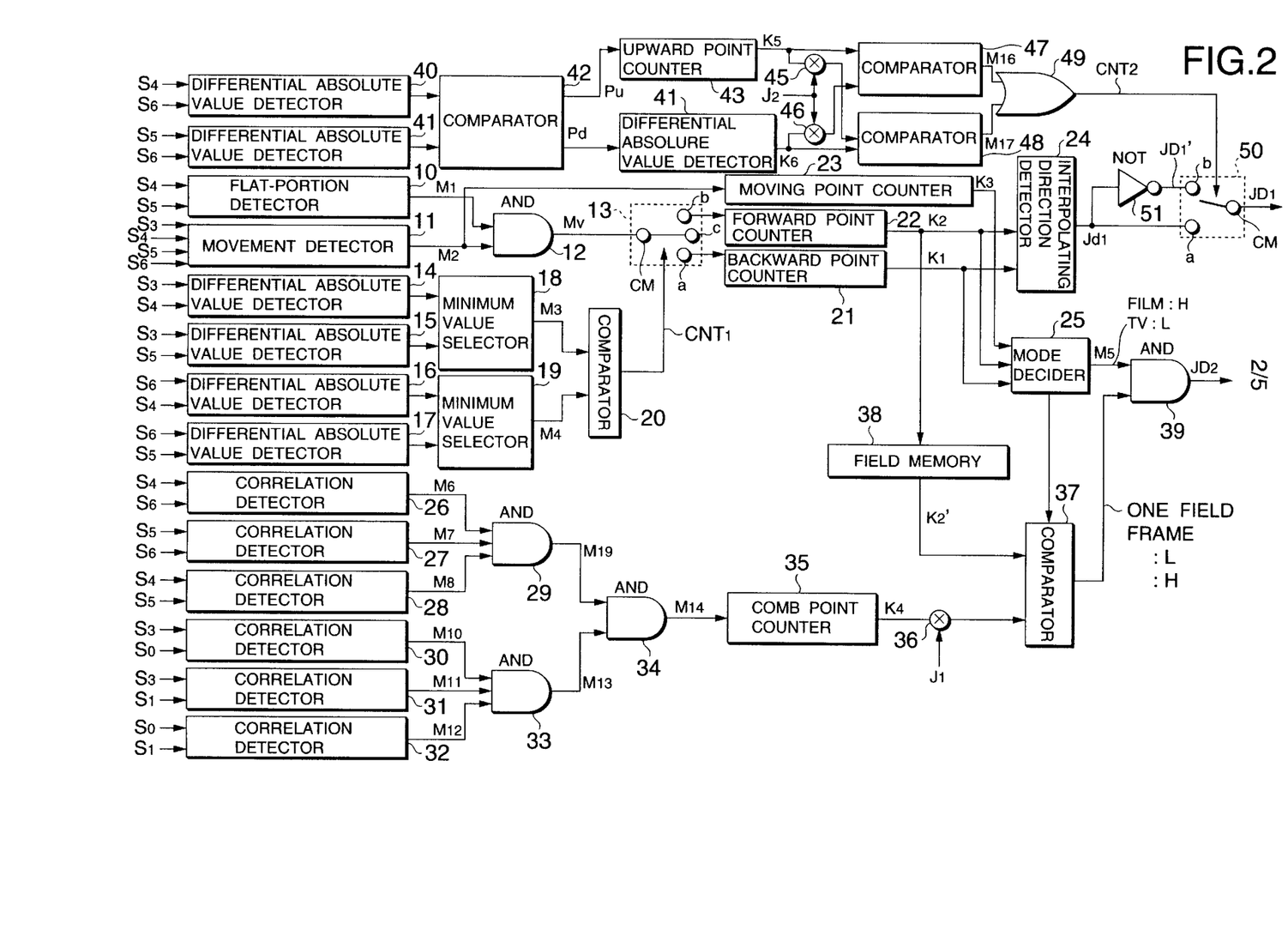
FIG. 2 is a diagram showing the internal configuration of the mode detector in FIG. 1.

FIG. 2 is a block diagram showing the internal arrangement of the mode detector 7. In FIG. 2, a flat-portion detector 10 computes the absolute value of the difference |S4−S5| of the actual scanning signals S5 and S4 (signals when they are viewed in units of a pixel) for display lines adjacent to each other in a vertical scanning direction within the same field and compares it with a prescribed threshold value THD1. If |S4−S5|<THD1, the flat-portion detector 10 determines that the image is flat in the vertical direction (i.e. the change in the luminance is slight or not present), and produces a flat-portion detecting pulse M1 with logic "H".

The movement detector 11 computes the absolute value of the difference |S3−S6| of the actual scanning signals S3 and S6 and the difference |S4−S5| of the actual scanning signals S4 and S5. If |S3−S6|/|S4−S5|>THD2 (prescribed threshold value), the movement detector 11 determines that the image is a moving or dynamic image and produces a movement detecting pulse M2 at logical "H".

An AND gate 12 takes the logical product of the flat portion detecting pulse M1 and the movement detecting pulse M2, and supplies the detected pulse MV at the logical "H" (detected pulse of the point which is flat and moving in the vertical scanning direction) to a common terminal CM of a switching circuit 13.

Differential absolute value detectors 14, 15, 16 and 17 compute a differential absolute value |S3−S4| between the actual scanning signals S3 and S4, a differential absolute value |S3−S5| between the actual scanning signals S3 and S5, a differential absolute value |S4−S6| between the actual scanning signals S4 and S6, and a differential absolute value |S5−S6| between the actual scanning signals S5 and S6.

A minimum value selector 18 produces a smaller value of the differential absolute values |S3−S4| and |S3−S5| as a detected signal M3. A minimum value selector 19 produces a smaller value of the differential absolute values |S4−S6| and |S5−S6| as a detected signal M4.

A comparator 20 compares the detected signals M3 and M4 supplied from the minimum value selectors 18 and 19. If M3≧h·M4 (h is a coefficient not smaller than 1, for example h=2), it is decided that the detected field (field of the actual scanning signals S4 and S5) correlates more strongly with a one-field-after field (field of the actual scanning signal S6) than with a one-field-before field (field of the actual scanning signal S3). On the basis of such a decision, the comparator 20 produces a switching control signal CNT1 for switching the switching circuit 13 to the side of contact a.

If M4≧h·M3 (h is a coefficient not smaller than 1, for example h=2), it is decided that the detected fields (fields of the actual scanning signals S4 and S5) correlate more strongly with a one-field-before field (field of the actual scanning signal S3) than with a one-field-after field (field of the actual scanning signal S6). On the basis of such a decision, the comparator 20 produces the switching control signal CNT1 for switching the switching circuit 13 to the side of contact b.

Further, if M3<h·M4 and M4<h·M3, it is decided that the detected field (field of the actual scanning signals S4 and S5 correlate approximately equally with the one-field-after field (field of the actual scanning signal S6) with the one-field-before field (field of the actual scanning signal S3). On the basis of such a decision, the comparator 20 produces the switching control signal CNT1 for switching the switching circuit 13 to a contact c.

A backward point counter 21 counts (integrates), for one field, the detected signal MV supplied when the switching circuit 13 is switched to the contact a and produces a total value K1.

A forward point counter 22 counts (integrates), for one field, the detected signal MV supplied when the switching circuit 13 is switched to the contact b and produces a total value K2.

A moving point counter 23 counts (integrates), for one field, the movement detecting pulse M2 supplied from the movement detector 11 and produces a total value K3.

It should be noted that each of the total values K1, K2 and K3 is reset immediately before the start of each field period and immediately after the end thereof.

An interpolating-direction detector 24 compares the total value K1 from the backward point counter 21 and the total value K2 from the forward point counter 22, and produces an interpolating-direction control signal Jd1 for controlling the interpolating direction in a film interpolator in a scanning line interpolator 9 described later.

More specifically, if the total value K1 is larger than the total value K2, it is decided that the detected field (field of the actual scanning signals S4 and S5) correlates more strongly with the one-field-after field (field of the actual scanning signal S6) than with the one-field-before field (field of the actual scanning signal S3). On the basis of such a decision, the interpolating-direction detector 24 produces an interpolating-direction control signal Jd1 at logical "H". On the other hand, if the total value K2 is larger than the total value K1, it is decided that the detected field (field of the actual scanning signals S4 and S5) correlate more strongly with the one-field-before field (field of the actual scanning signal S3) than with the one-field-after field (field of the actual scanning signal S6). On the basis of such a decision, the interpolating-direction detector 24 produces an interpolating-direction control signal Jd1 at logical "L". If the total values K1 and K2 are approximately equal to each other, either one of the logical "H" and logical "L" is produced as the interpolating-direction control signal Jd1.

A mode decider 25 decides whether the detected field (field of the actual scanning signals S4 and S5) is a film mode signal or a TV mode signal on the basis of the total value K1 from the backward point counter 21, total value K2 from the forward point counter 22 and total value K3 from the movement counter 23. On the basis of this decision, the mode decider 25 produces a detection signal M5 exchanging between an output from an adaptive interpolator (interpolated output for the TV mode) and an output from a film interpolator (interpolated output for the film mode) within the scanning line interpolator 9 as described later.

Specifically, the mode decider 25 compares the total values KI and K2 with each other and compares the total value K3 with a prescribed threshold value P. If K1≧i·K2 (i is a coefficient larger than 1), it is decided that the detected field (field of the actual scanning signals S4 and S5) is the backward film mode signal correlated strongly with the one-field-after field (field of the actual scanning signal S6). If K2≧i·K1, it is decided that the detected field (field of the actual scanning signals S4 and S5) is the forward mode signal correlated strongly with the one-field-before field (field of the actual scanning signal S3). Further, if K1<i·K2 and K2<i·K1, and K3≧P, it is decided that the detected field is a signal in the TV mode of a moving image. If K1<i·K2 and K2<i·K1, and K3≦P, it is decided that the detected field is a signal in a still image mode.

If it is decided that the detected field is the backward or forward film mode signal, the mode decider 25 produces a detected signal at logical "H". If it is decided that the detected field is the signal in the TV mode of the moving image, the decider 25 produces the detected signal M5 at logical "L".

Additionally, if it is decided that the detected field is the signal in the still image mode, on the assumption that it is in the same mode (film mode or TV mode) as the mode decided in the one-field-before field, the decider 25 produces the detected signal at logical "H" or logical "L".

A correlation detector 26 computes a differential absolute value |S4−S6| between the actual scanning signals S4 and S6 and compares it with a threshold value THD3. If |S4−S6|≧THD3, the correlation detector 26 decides that the correlation between the actual scanning signals S4 and S6 |S4−S6| is weak, and produces a detected signal M6 at logical "H". If |S4−S6|<THD3, the correlation detector 26 decides that the correlation between the actual scanning signals S4 and S6 is strong, and produces the detected signal M6 at logical "L".

A correlation detector 27 computes a differential absolute value |S5−S6| between the actual scanning signals S5 and S6 and compares it with a threshold value THD4. If |S5−S6|≧THD4, the correlation detector 27 decides that the correlation between the actual scanning signals S5 and S6 is weak, and produces a detected signal M7 at logical "H". If |S5−S6|<THD4, the correlation detector 27 decides that the correlation between the actual scanning signals S5 and S6 is strong, and produces the detected signal M7 at logical "L".

A correlation detector 28 computes a differential absolute value |S4−S5| between the actual scanning signals S4 and S5 and compares it with a threshold value THD5. If |S4−S5|<THD5, the correlation detector 28 decides that the correlation between the actual scanning signals S4 and S5 is strong, and produces a detected signal M8 at logical "H". If |S4−S5|≧THD5, the correlation detector 28 decides that the correlation between the actual scanning signals S4 and S5 is weak, and produces the detected signal M8 at logical "L".

An AND gate 29 takes a logical product of these detected signals M6–M8. If all the detected signals M6–M8 are logical "H", the AND gate 29 produces a detected signal M9 at logical "H" indicative of that correlation is present between the actual signals S4 and S5 whereas correlation is not present between the actual scanning signals S4 and S6 and between the actual signals S5 and S6.

A correlation detector 30 computes a differential absolute value |S0−S3| between the actual scanning signals S0 and S3 and compares it with a threshold value THD6. If |S0−S3|<THD6, the correlation detector 30 decides that the correlation between the actual scanning signals S0 and S3 is strong, and produces a detected signal M10 at logical "H". If |S0−S3|≧THD6, the correlation detector 30 decides that the correlation between the actual scanning signals S0 and S3 is weak, and produces the detected signal M10 at logical "L".

A correlation detector 31 computes a differential absolute value |S1−S3| between the actual scanning signals S1 and S3 and compares it with a threshold value THD7. If |S1−S3|<THD7, the correlation detector 31 decides that the correlation between the actual scanning signals S1 and S3 is strong, and produces a detected signal M11 at logical "H". If |S1−S3|≧THD7, the correlation detector 31 decides that the correlation between the actual scanning signals S1 and S3 is weak, and produces the detected signal M11 at logical "L".

A correlation detector 32 computes a differential absolute value |S0−S1| between the actual scanning signals S0 and S1 and compares it with a threshold value THD8. If |S0−S1|<THD8, the correlation detector 32 decides that the correlation between the actual scanning signals S0 and S1 is strong, and produces a detected signal M12 at logical "H". If |S0−S1|≧THD8, the correlation detector 32 decides that the correlation between the actual scanning signals between the actual scanning signals S0 and Sl is weak, and produces the detected signal. M12 at logical "L".

An AND gate 33 takes a logical product of these detected signals M10–M12. If all the detected signals M10–M12 are logical "H", the AND gate 33 produces a detected signal M13 at logical "H" indicative of that correlation is present between the actual signals S0 and S1 whereas correlation is not present between the actual scanning signals S0 and S3 and between the actual signals S1 and S3.

If the detected signal M9 from the AND gate 29 is logical "H" and the detected signal M13 from the AND gate 33 is logical "H", an AND gate 34 produces a detected pulse M14. Namely, the detected pulse M14 indicates a point where correlation is present between the actual signals S4 and S5 whereas correlation is not present between the actual scanning signals S4 and S6 and between the actual signals S5 and S6; and correlation is present between the actual signals S0 and S1 whereas correlation is not present between the actual scanning signals S0 and S3 and between the actual signals S5 and S3.

A comb point counter 35 counts (integrates), for one field, the detected pulse M14 supplied from the AND gate 34 and produces a total value K4. It should be noted that the total value K4 of the comb point counter 35 is reset immediately before the start of each field period and immediately after the end thereof.

The total value K4 is multiplied by J1 by a multiplier 36 and supplied to a comparator 37. The total value K2 from the forward point counter 22 is delayed by a one field period by a one-field memory 38 and supplied to the comparator 37.

The comparator 37 compares the total value J1·K4 from the multiplier 36 and the total value K2' in the one-field-before field in the forward point counter 22. If J1·K4≧K2 and the one-field-before field was decided to be forward, it is decided that the detected field (field of the actual scanning signals S4 and S5) is an editing point field of a film frame of one field. On the basis of this decision, the comparator 37 produces a detected signal M13 at logical "L". On the other hand, if J1·K4≧K2', the comparator 37 decides that the detected field is not the editing point field and produces the detected signal M15 at logical "H".

An AND gate 39 takes a logical product of the detected signal from the mode decider 25 and the detected signal M15 from the comparator 37. If the detected field in the film mode (the detected signal M5 is logical "H") and is not the editing point field of the film frame of one field (the detected signal M15 is logical "H"), the AND gate 39 produces an interpolation output switching control signal JD2 at logical "H" which switches an interpolated output from the scanning line interpolator 9 (described later) to the output (interpolated output for the film mode) from the film interpolator 53.

If the detected field is the editing point field of the film frame of one field (detected signal M15 is logical "L"), the AND gate 39 produces the interpolated output switching control signal JD2 which switches the interpolated output from the scanning line interpolator 9 to the output (interpolated output for the TV mode) from an adaptive interpolator 52.

If the detected field is in the TV mode (detected signal M5 is logical "L"), the AND gate 39 produces the interpolated output switching control signal JD2 which switches the output from the scanning line interpolator 9 to the output (interpolated output for the TV mode) from the adaptive interpolator 52.

Differential absolute value detectors 40 and 41 compute a differential absolute value |S4−S6| between the actual scanning signals S4 and S6 and a differential absolute value |S5−S6| between the actual scanning signals S5 and S6, respectively.

A comparator 42 compares the differential absolute values |S4−S6| and |S5−S6| supplied from the differential absolute value detectors 40 and 41, respectively. If |S5−S6|≧k·|S4−S6|, it is decided that the actual scanning signal S6 correlates more strongly with the actual scanning signal S4 on the upper line before one field than the actual scanning signal S5 on the lower line before one field. On the basis of such a decision, the comparator 42 produces an upward detected pulse Pu at logical "H".

On the other hand, If |S4−S6|≧k·S5−S6| (k is a coefficient not smaller than 1, for example k=2), it is decided that the actual scanning signal S6 correlates more strongly with the actual scanning signal S5 on the lower line before one field than the actual scanning signal S4 on the upper line before one field. On the basis of such a decision, the comparator 42 produces a downward detected pulse Pd at logical "H".

An upward point counter 43 counts (integrates) the upward detected pulse Pu for one field period to produce a total value K5. A downward point counter 44 counts (integrates) the downward detected pulse Pd for one field period to produce a total value K6. It should be noted that the respective total values K5 and K6 of the upward point counter 43 and downward point counter 44 are reset immediately before the start of each field period and immediately after the end thereof.

The respective total values K5 and K6 of the upward point counter 43 and downward point counter 44 are multiplied by J2 by multipliers 45 and 46, respectively. The multiplied values from the multipliers 45 and 46 are supplied to comparators 48 and 47, respectively.

A comparator 47 compares the total values KS and J2·K6. If K5≧J2·K6, the comparator 47 produces a detected signal M16 at logical "H". If K5<J2·K6, the comparator 47 produces the detected signal M16 at logical "L".

A comparator 48 compares the total values K6 and J2·K5. If K6≧J2·K5, the comparator 48 produces a detected signal M17 at logical "H". If K6<J2·K5, the comparator 48 produces the detected signal M16 at logical "L".

A logical sum gate (OR gate) 49 takes a logical sum of the detected signals M16 and M17. If its output is logical "L", i.e. the total values KS and K6 are approximately equal, the logical sum gate 49 produces a control signal CNT2 which switches the interpolating switching circuit 50 to a contact a.

On the other hand, if its output is logical "H", i.e. the total values KS and K6 are largely different from each other (there is a movement of one dot or so per one field in the vertical scanning direction on the detected field), the logical sum gate 49 produces a control signal CNT2 which switches the interpolating switching circuit 50 to a contact b.

The contact a of the switching circuit 50 is supplied with the interpolating direction control signal Jd1 from the interpolating direction detector 24, whereas the contact b of the switching circuit 50 is supplied with the interpolating direction control signal Jd1' whose logic has been inverted by an inverting gate (NOT gate) 51.

If there is a movement of one dot or so per one field in the vertical scanning direction on the detected field (the total values K5 and K6 are largely different from each other), the interpolating-direction detector 24 may erroneously detect the interpolating direction. However, since the logic of the interpolating-direction control signal Jd1 determined by the interpolating-direction detector 24 is inverted according to the values of the total values K5 and K6 so that the interpolating direction is reversed, it can be properly set in the film interpolating processing.

Figure 3:
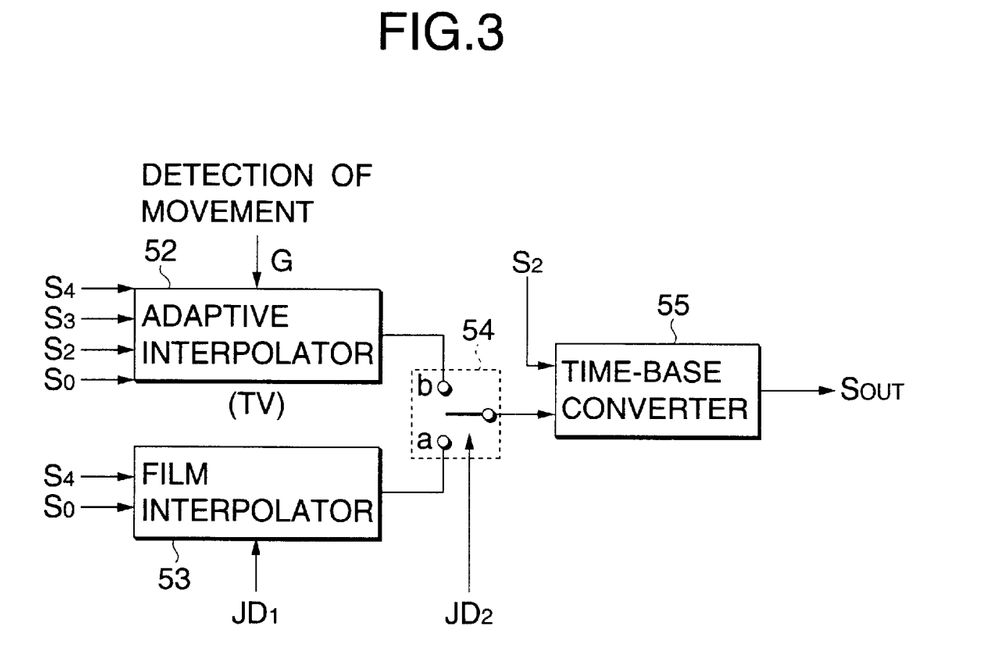
FIG. 3 is a diagram showing the internal configuration of the scanning line interpolator in FIG. 1.

FIG. 3 is a block diagram showing the internal configuration of the scanning line interpolator 9 in FIG. 1. As seen from FIG. 3, the scanning line interpolator 9 includes an adaptive interpolator 52, a film interpolator 53, a switching circuit 54 and an time-base converter 55. The adaptive interpolator 52 serves to create an interpolated scanning signal by movement adaptive interpolating processing on the basis of the actual scanning signals S0, S2, S3 and S4 and a movement control coefficient G from the movement detector 8. The film interpolator 53 serves to create an interpolated scanning signal by film interpolating processing on the basis of the actual scanning signals S0 and S4 and the interpolating-direction control signal JD1 from the mode detector 7. The switching circuit 54 serves to switch between the output from the adaptive interpolator 52 (adaptive interpolated scanning signal, i.e. interpolated scanning signal for the TV mode) from the adaptive interpolator 52 and the output (film interpolated scanning signal, i.e. interpolated scanning signal for the film mode) from the film interpolator 53 in response to the interpolated output switching control signal JD2 from the mode detector 7. The time base converter 55 serves to interpose the interpolated scanning signal supplied from the switching circuit 54 and the actual scanning signal S2 alternately on the time base to create a video signal Sout by the sequential scanning (non-interlaced scanning).

By the in-field interpolating processing, the adaptive interpolator (interpolator for the TV mode) 52 additive-averages the actual scanning signals S2 and S3 located up and down in the same field with respect to an interpolated scanning signal (interposed between the actual scanning signals S2 and S3 thereby to create the first interpolated scanning signal ((S2+S3)/2). Likewise, by the inter-field interpolating processing, the adaptive interpolator 52 additive-averages the actual scanning signals S0 and S4 located one-field-period after and before with respect to an interpolated scanning signal (interposed between the actual scanning signals S2 and S3 thereby to create the second interpolated scanning signal ((S0+S4)/2). Further, the adaptive interpolator 52 weight-averages the first and second interpolated scanning signals using a movement control coefficient (0≦G≦1) to create an adaptive interpolated scanning signal, i.e. interpolated scanning signal for the TV mode for the interpolated field (field to which the actual scanning signals S2 and S3 belong).

Specifically, the output from the adaptive interpolator (interpolator for the TV mode) 52 is created according to Equation (1):

$$(S2+S3)\cdot G/2+(S0+S4)\cdot(1-G)/2 \tag{1}$$

Incidentally, the movement control coefficient G is set at "0" for the still image and at 0<G≦1 for the moving image.

If the movement control coefficient G is "0", the output from the adaptive interpolator 52 is the interpolated scanning signal created by the inter-field interpolating processing. If the movement control coefficient G is "1", the output from the adaptive interpolator 5 is the interpolated scanning signal created by the in-field interpolating processing.

If the logic of the interpolating-direction control signal JD1 from the mode detector 7 is "H", i.e. the interpolated field (field to which the actual scanning signals S2 and S3 belong) correlates strongly with the one-field-period-after field (field of the actual scanning signal S4), the film interpolator (interpolator for the film mode) 53 produces the actual scanning signal S1 of the one-field-period-after field, as it is, as the interpolated scanning signal (to be interposed between the actual scanning signals S2 and S3).

If the logic of the interpolating-direction control signal JD1 from the mode detector 7 is "L", i.e. the interpolated field (field to which the actual scanning signals S2 and S3 belong) correlates strongly with the one-field-period-before field (field of the actual scanning signal S0), the film interpolator (interpolator for the film mode) 53 produces the actual scanning signal S0 of the one-field-period-before field, as it is, as the interpolated scanning signal (to be interposed between the actual scanning signals S2 and S3).

If the interpolated field (field to which the actual scanning signals S2 and S3 belong) in the film mode (the detected signal MS is logical "H") and is not the editing point field of the film frame of one field, the switching circuit 54 is switched into the contact a by the interpolated output switching control signal JD2 at logical "H" so that the output from the film interpolator 53 (interpolated output for the film mode) is supplied to the time-base converter 55.

If the interpolated field (field to which the actual scanning signals S2 and S3 belong) is the editing point field of the film frame of one field, the switching circuit 54 is switched into the contact b by the interpolated output switching control signal JD2 at logical "L" so that the output from the adaptive interpolator 52 (interpolated output for the TV mode) is supplied to the time-base converter 55.

If the interpolated field (field to which the actual scanning signals S2 and S3 belong) is in the TV mode, the switching circuit 54 is switched into the contact b by the interpolated output switching control signal JD2 at logical "L" so that the output from the adaptive interpolator 52 (interpolated output for the TV mode) is supplied to the time-base converter 55.

More specifically, if the interpolated field is the editing point field of the film frame of one field, the interpolated field and the one-field-period-before and one-filed-period-after fields are different film frames. Therefore, if the film interpolating processing (the actual scanning signal of each of the one-field-period-before and one-field-period-after field is employed as it is as the interpolated scanning signal) is executed as it is, comb disturbance occurs. However, in such a case, by adopting the output from the adaptive interpolator 52 (interpolated output for the TV mode) as an interpolated scanning signal, the comb disturbance can be prevented.

Where a large number of fields with the logic of the output detected signal M15 from the comparator 37 being "L" are generated in a relatively short period, with the logic of the detected signal M15 being made "L" for a prescribed period, the output from the adaptive interpolator 52 (interpolated output for the TV mode) may be supplied to the time-base converter 55.

Figure 4:
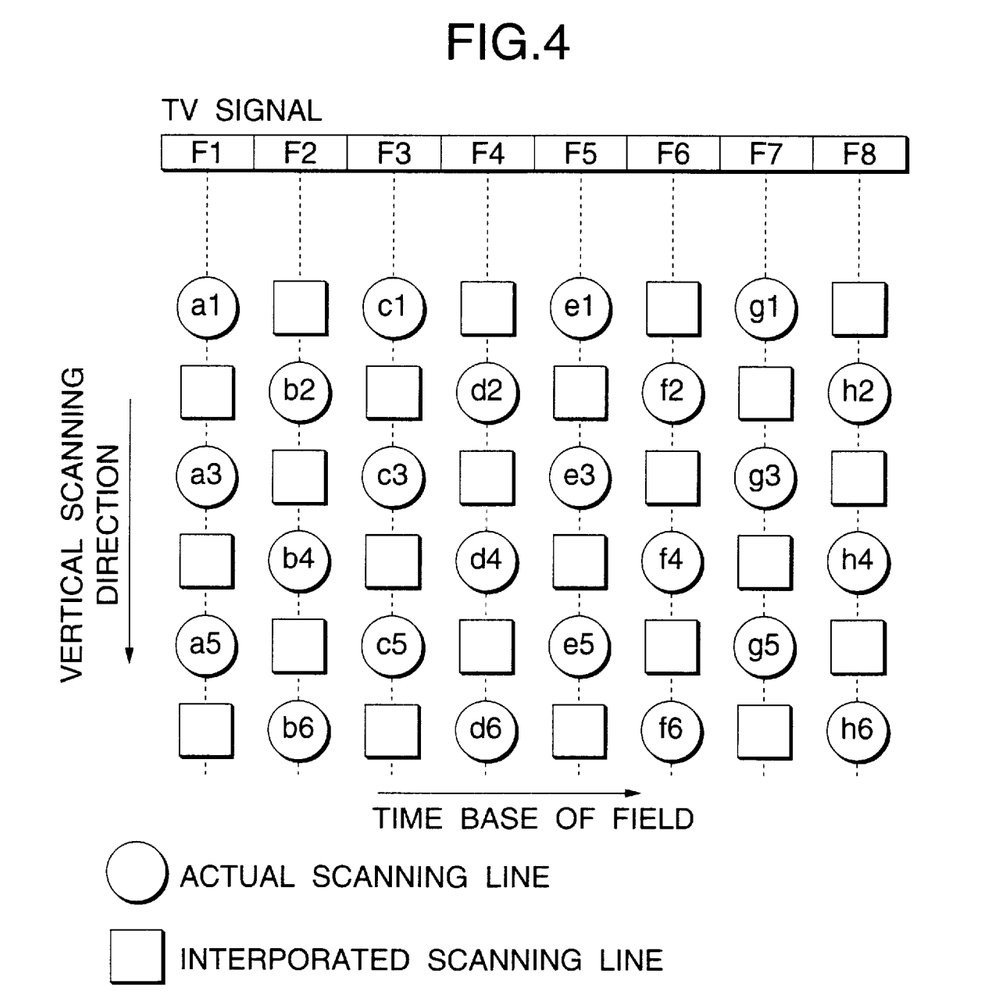
FIG. 4 is a time and spatial relationship between the actual scanning signals in the video signal by the ordinary interlaced scanning based on the ordinary standard television system and interpolated scanning signals.
Figure 5:
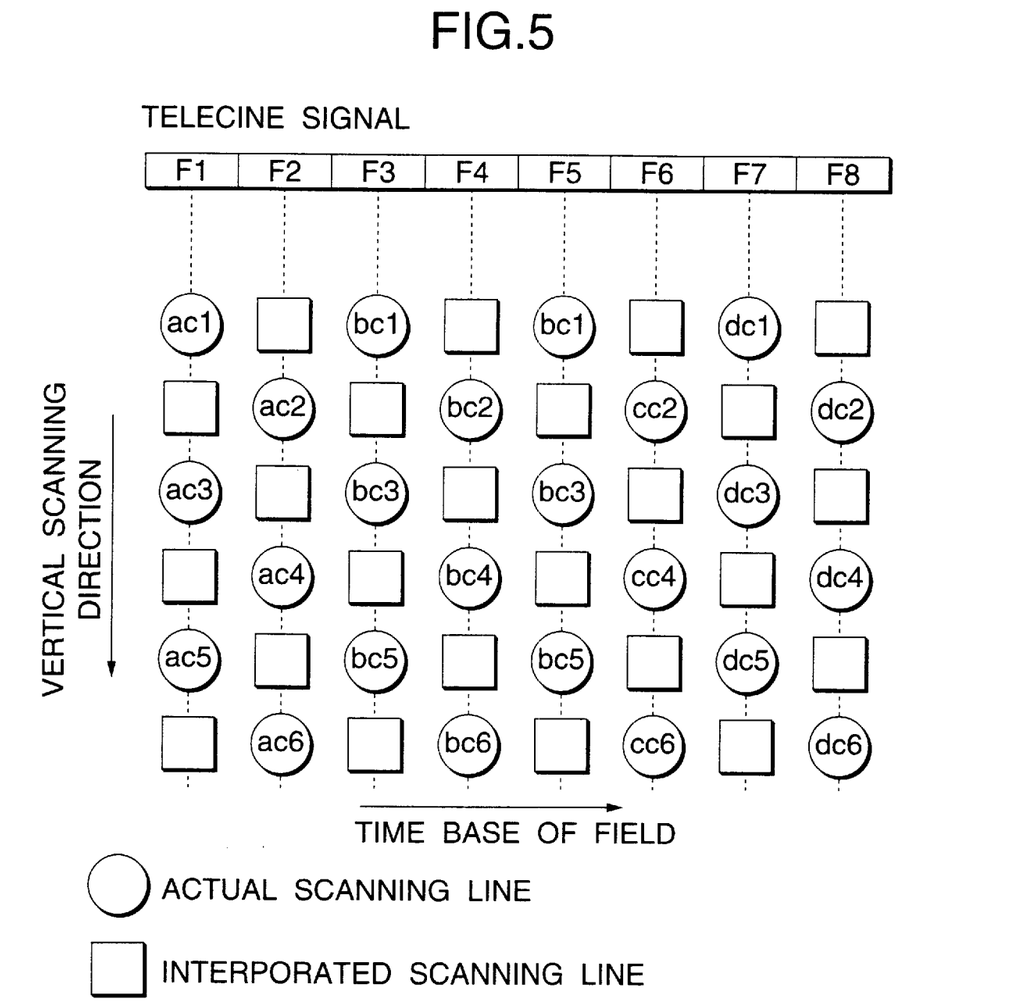
FIG. 5 is a time and spatial relationship between the actual scanning signals in the video signal by the interlaced scanning telecine-converted by the 2-3 pulldown system and interpolated scanning signals.

Referring to FIGS. 4 and 5, a process will be explained where the video signal by the sequential scanning is created from the input video signal by the interlaced scanning.

FIG. 4 is a time and spatial relationship between the actual scanning signals ($\Phi$ mark in the figure) in the video signal by the interlaced scanning based on the ordinary standard television system and the interpolated scanning signals ($\Gamma$ mark in the figure) created by the interpolating processing. In FIG. 4, symbols F1–F8 denote respective fields, and symbols a1, a3, a5, . . . , h2, h4, h6 denote actual scanning signals in each field.

FIG. 5 is a time and spatial relationship between the actual scanning signals ($\Phi$ mark in the figure) in the video signal by the interlaced scanning telecine-converted by the 2-3 pulldown system and the interpolated scanning signals ($\Gamma$ mark in the figure) created by the interpolating processing. In FIG. 5, symbols F1–F8 denote respective fields, and symbols ac1, ac3, ac5, . . . , dc2, dc4, dc6 denote actual scanning signals in each field.

The fields F1 and F2, fields F3–F5 and fields F7 and F8 are fields which belongs to the same film frame, respectively. The fields F3 and F4 represent the same video signal. The field F6 is the editing point field of a single field frame created by video editing.

First, referring to FIG. 4, an explanation will be given of the creation of the interpolated scanning signal where the input video signal is the video signal by the interlaced scanning of the moving image based on the standard television system.

In this case, in each field, the total values K1→K6 counted during the one field period provide relationships K1≈K2, K3≧P, J1·K4<K2', and K5≈K6. Therefore, the mode detector 7 decides each filed to be in the TV mode so that the interpolated output switching control signal JD2 at logical "L" is produced. Thus, the switching circuit 54 within the scanning line interpolator 9 is switched into the contact b, and hence the output (interpolated output for the TV mode) from the adaptive interpolator 52 is supplied to the time base converter 55.

For example, the interpolated scanning signal (output from the adaptive interpolator 52) located between the actual scanning signals c1 and c3 of the field F3 provides:

$$(c1+c3) \cdot G/2 + (b2+d2) \cdot (1-G)/2$$

Next, referring to FIG. 5, an explanation will be given of the creation of the interpolated scanning signal where the input video signal is the video signal by the interlaced scanning telecine-converted by the 2-3 pulldown system.

In FIG. 5, the respective total values K1, K2 and K4 of the backward point counter 21, forward point counter 22 and comb point counter 35 in the fields Fl, F3 and F7, and the total value K2' of the point counter 22 in their one-field-period-before field provide the relationships K1≧i·K2 and J1·K4<K2'.

Therefore, the mode detector 7 decides each of the fields F1, F3 and F7 to be in the film mode (backward film mode) so that the interpolated output switching control signal JD2 at logical "H" is produced. Thus, the switching circuit 54 within the scanning line interpolator 9 is switched into the contact a, and hence the output (interpolated output for the film mode) from the film interpolator 53 is supplied to the time base converter 55. In addition, the interpolating-direction control signal JD1 at logical "H" is produced so that the interpolating direction in the film interpolator 53 is set at a future side (the actual scanning signal in the one-field-period-after field is employed).

Namely, the film interpolator 53 produces the actual scanning signals in the one-field-period-after fields F2, F4 and F8, as they are, which are located at the same spatial positions as the fields F1, F3 and F7, as the interpolated scanning signals to the interpolated scanning lines of the fields F1, F3 and F7, respectively.

For example, the interpolated scanning signal (output from the film interpolator 53) for the interpolated scanning line located between the actual scanning signals ac1 and ac3 of the field F1 is the same as the actual scanning signal ac2 of the field F2.

Further, the respective total values K1, K2 and K4 of the point counter 21, forward point counter 22 and comb point counter 35 in the fields F2, F5 and F8, and the total value K2' of the forward point counter 22 in their one-field-period-before field provide the relationships K2≧i·K1 and J1·K4<K2'.

Therefore, the mode detector 7 decides each of the fields F2, F5 and F8 to be in the film mode (forward film mode) so that the interpolated output switching control signal JD2 at logical "H" is produced. Thus, the switching circuit 54 within the scanning line interpolator 9 is switched into the contact a, and hence the output (interpolated output for the film mode) from the film interpolator 53 is supplied to the time base converter 55. In addition, the interpolating-direction control signal JD1 at logical "H" is produced so that the interpolating direction in the film interpolator 53 is set at a past side (the actual scanning signal in the one-field-period-before field is employed).

Namely, the film interpolator 53 produces the actual scanning signals in the one-field-period-after fields F2, F4 and F8, as they are, which are located at the same spatial positions as the fields F1, F4 and F7, as the interpolated scanning signals to the interpolated scanning lines of the fields F2, F5 and F8, respectively.

For example, the interpolated scanning signal (output from the film interpolator 53) for the interpolated scanning line located between the actual scanning signals ac2 and ac4 of the field F2 is the same as the actual scanning signal ac3 of the field F1.

Further, the respective total values K1→K4 of the backward point counter 21, forward point counter 22 and comb point counter 35 in the field F4, and the total value K2' of the forward point counter 22 in their one-field-period-before field provide the relationships K2<i·K1 and K2<i·K1, namely K1=K2 and K3≦P, J1·K4<K2'.

Therefore, the mode detector 7 decides the field F4 to be the signal in the still image mode and in the same mode (film mode) as the mode decided in the one-field-period-before field so that the interpolated output switching control signal JD2 at logical "H" is produced. Thus, the switching circuit 54 within the scanning line interpolator 9 is switched into the contacts, and hence the output (interpolated output for the film mode) from the film interpolator 53 is supplied to the time base converter 55. In addition, the interpolating-direction control signal JD1 is produced to set the interpolating direction in the film interpolator 53.

Further, the total value K4 of the comb point counter 35 in the field F6, and the total value K2' of the forward point counter 22 in its one-field-period-before field provide the relationships J1·K4>K2', and the field F5 is forward.

Therefore, the mode detector 7 decides the field F6 to be the editing point field of a single field frame created by video editing so that the interpolated output switching control signal JD2 at logical "L" is produced as described above. Thus, the switching circuit 54 within the scanning line interpolator 9 is switched into the contact b, and hence the output (interpolated output for the film mode) from the adaptive interpolator 52 is supplied to the time base converter 55.

For example, the interpolated scanning signal (output from the adaptive interpolator 52) located between the actual scanning signals cc2 and cc4 provides:

$$(cc2+cc4) \cdot G/2 + (bc3+dc3) \cdot (1-G)/2$$

Where there is a movement of one dot or so for one field in the vertical direction on the field F3, for example, the the interpolating-direction detector 24 may erroneously decide the interpolating direction as being the past side (forward film mode).

Where there is a movement of one dot or so per one field in the vertical scanning direction, the total value K5 of the upward point counter 43 and the total value K6 of the downward point counter 44 are greatly different from each other. For this reason, in the field indicative of this relationship, the logic of the interpolating direction determined by the interpolating direction detector 24 is inverted to reverse the interpolating direction. Namely, by setting the interpolating direction at the future side (backward film mode), the interpolating direction in the film interpolating processing can be properly set.

As described above, in accordance with the present invention, whether or not the input video signal is a telecine-converted video signal on the basis of each of the correlation values between the interpolated field and the fields located one-field-period-before and -after it. For this reason, whether or not the input video signal is the telecine-converted video signal can be decided quickly.

Where the interpolated field is an editing point field of a film frame of one field, by subjecting the input video signal to not the film interpolating processing but the adaptive interpolating processing, it can be converted into the video signal by the sequential scanning free from disturbance.

Where there is a movement of one dot or so per one field in the vertical scanning direction, by reversing the interpolating direction in the film interpolating processing to the interpolating direction determined by the first deciding means, suitable interpolating processing can be carried out.

What is claimed is:

1. A video signal converting apparatus for creating an interpolated scanning signal from an input video signal by interlaced scanning and interposing an actual scanning signal of the input video signal and the interpolated scanning signal between each other to create a video signal by sequential scanning, the video signal converting apparatus comprising:

a first detecting means for detecting a first correlation value between an interpolated field in the input video signal and a first field located one-field-period-before the interpolated field;

a second detecting means for detecting a second correlation value between an interpolated field in the input video signal and a second field located one-field-period-after the interpolated field;

a first deciding means for deciding whether or not the interpolated field is a telecine-converted video signal and deciding an interpolating method for the interpolated field where the interpolated field is the telecine-converted video signal;

a second deciding means for deciding whether or not the interpolated field is an editing point field of a film frame of one field; and an interpolated signal creating means for setting the interpolating processing for the interpolated field at either of adaptive interpolating processing and film interpolating processing in response to the decision results of the first and the second deciding means to create the interpolated scanning signal, wherein if it is decided that the interpolated field is the telecine-converted video signal on the basis of the decision result of the first deciding means, the interpolated signal creating means sets the interpolating processing for the interpolated field at the film interpolating processing to create the interpolated scanning signal; and if it is decided that the interpolated field is the editing field on the basis of the decision result of the second deciding means, the interpolated signal creating means sets the interpolating processing for the interpolated field at the adaptive interpolating processing to create the interpolated signal.

2. The video signal converting apparatus according to claim 1, wherein the first detecting means integrates flat and moving characteristic points in a vertical scanning direction in a region of the interpolated field which correlates more strongly with the first field than the second field, thereby detecting the first correlation value; and the second detecting means integrates flat and moving characteristic points in a vertical scanning direction in a region of the interpolated field which correlates more strongly with the second field than the first field, thereby detecting the second correlation value.

3. The video signal converting apparatus according to claim 1, wherein if the first correlation value is larger than the second correlation value or the second correlation value is larger than the first correlation value, the first deciding means decides that the interpolated field is the telecine-converted video signal; and if a total value of characteristic points is not smaller than a prescribed value, the second deciding means decides that the interpolated field is the editing point field, wherein the characteristic points satisfy a condition that a correlation between the first field and a third field two field periods before the interpolated field is large, a correlation between two signals in the third field in a vertical scanning direction is large, a correlation between two signals in the interpolated field in a vertical direction is large, and a correlation between the interpolated field and the second field is small.

4. The video signal converting apparatus according to claim 1, wherein in the adaptive interpolating processing, the interpolated signal creating means acquires a first interpolated scanning signal by in-field interpolating processing and a second interpolated signal by inter-field interpolating processing, respectively and weight-adds the first and second interpolated scanning signals on the basis of movement information of an image, thereby creating the interpolated scanning signal; and in the film interpolated processing, the interpolated signal creating means creates the interpolated scanning signal on the basis of actual scanning signals within the first or second field.

5. A video signal converting apparatus for creating an interpolated scanning signal from an input video signal by interlaced scanning and interposing an actual scanning signal of the input video signal and the interpolated scanning signal between each other to create a video signal by sequential scanning, the video signal converting apparatus comprising:

a first detecting means for detecting a first correlation value between an interpolated field in the input video signal and a first field located one-field-period-before the interpolated field;

a second detecting means for detecting a second correlation value between an interpolated field in the input video signal and a second field located one-field-period-after the interpolated field;

a first deciding means for deciding whether or not the interpolated field is a telecine-converted video signal and deciding an interpolating direction of the interpolated field where the interpolated field is the telecine-converted video signal;

a third deciding means for deciding whether or not there is a movement of about one dot per one field in the vertical scanning direction on the interpolated field; and an interpolated signal creating means for setting the interpolating processing for the interpolated field at either adaptive interpolating processing or film interpolating processing in response to the decision result of the first deciding means to create the interpolated scanning signal, wherein if it is decided that the interpolated field is the telecine-converted video signal on the basis of the decision result of the first deciding means, the interpolated signal creating means sets the interpolating processing for the interpolated field at the film interpolating processing; and if it is decided that there is the movement in the vertical direction on the basis of the decision result of the third deciding means, the interpolated signal creating means sets the interpolating direction in the film interpolating processing at a direction reverse to that decided by the first deciding means.

6. A video signal converting apparatus for creating an interpolated scanning signal from an input video signal by interlaced scanning and interposing an actual scanning signal of the input video signal and the interpolated scanning signal between each other to create a video signal by sequential scanning, the video signal converting apparatus comprising:

a first detector for detecting a first correlation value between an interpolated field in the input video signal and a first field located one-field-period-before the interpolated field;

a second detector for detecting a second correlation value between an interpolated field in the input video signal and a second field located one-field-period-after the interpolated field;

a first decider for deciding whether or not the interpolated field is a telecine-converted video signal and deciding an interpolating method for the interpolated field where the interpolated field is the telecine-converted video signal;

a second decider for deciding whether or not the interpolated field is an editing point field of a film frame of one field; and an interpolated signal creator for setting the interpolating processing for the interpolated field at either of adaptive interpolating processing and film interpolating processing in response to the decision results of the first and the second decider to create the interpolated scanning signal, wherein if it is decided that the interpolated field is the telecine-converted video signal on the basis of the decision result of the first decider, the interpolated signal creator sets the interpolating processing for the interpolated field at the film interpolating processing to create the interpolated scanning signal; and if it is decided that the interpolated field is the editing field on the basis of the decision result of the second decider, the interpolated signal creator sets the interpolating processing for the interpolated field at the adaptive interpolating processing to create the interpolated signal.

7. The video signal converting apparatus according to claim 6, wherein the first detector integrates flat and moving characteristic points in a vertical scanning direction in a region of the interpolated field which correlates more strongly with the first field than the second field, thereby detecting the first correlation value; and the second detector integrates flat and moving characteristic points in a vertical scanning direction in a region of the interpolated field which correlates more strongly with the second field than the first field, thereby detecting the second correlation value.

8. The video signal converting apparatus according to claim 6, wherein if the first correlation value is larger than the second correlation value or the second correlation value is larger than the first correlation value, the first decider decides that the interpolated field is the telecine-converted video signal; and if a total value of characteristic points is not smaller than a prescribed value, the second decider decides that the interpolated field is the editing point field, wherein the characteristic points satisfy a condition that a correlation between the first field and a third field two field periods before the interpolated field is large, a correlation between two signals in the third field in a vertical scanning direction is large, a correlation between two signals in the interpolated field in a vertical direction is large, and a correlation between the interpolated field and the second field is small.

9. The video signal converting apparatus according to claim 6, wherein in the adaptive interpolating processing, the interpolated signal creator acquires a first interpolated scanning signal by in-field interpolating processing and a second interpolated signal by inter-field interpolating processing, respectively and weight-adds the first and second interpolated scanning signals on the basis of movement information of an image, thereby creating the interpolated scanning signal; and in the film interpolated processing, the interpolated signal creator creates the interpolated scanning signal on the basis of actual scanning signals within the first or second field.

10. A video signal converting apparatus for creating an interpolated scanning signal from an input video signal by interlaced scanning and interposing an actual scanning signal of the input video signal and the interpolated scanning signal between each other to create a video signal by sequential scanning, the video signal converting apparatus comprising:

a first detector for detecting a first correlation value between an interpolated field in the input video signal and a first field located one-field-period-before the interpolated field;

a second detector for detecting a second correlation value between an interpolated field in the input video signal and a second field located one-field-period-after the interpolated field;

a first decider for deciding whether or not the interpolated field is a telecine-converted video signal and deciding an interpolating direction of the interpolated field where the interpolated field is the telecine-converted video signal;

a third decider for deciding whether or not there is a movement of about one dot per one field in the vertical scanning direction on the interpolated field; and an interpolated signal creator for setting the interpolating processing for the interpolated field at either adaptive interpolating processing or film interpolating processing in response to the decision result of the first decider to create the interpolated scanning signal, wherein if it is decided that the interpolated field is the telecine-converted video signal on the basis of the decision result of the first decider, the interpolated signal creator sets the interpolating processing for the interpolated field at the film interpolating processing; and if it is decided that there is the movement in the vertical direction on the basis of the decision result of the third decider, the interpolated signal creator sets the interpolating direction in the film interpolating processing at a direction reverse to that decided by the first decider.

* * * * *